INVENTORS
EARLE W. GARD.
BLAIR G. ALDRIDGE.
BY HUGH J. MULTER.
RAYMOND T. HOWES
Marvin L. Chappell ATTORNEY Patented May 20, 1930

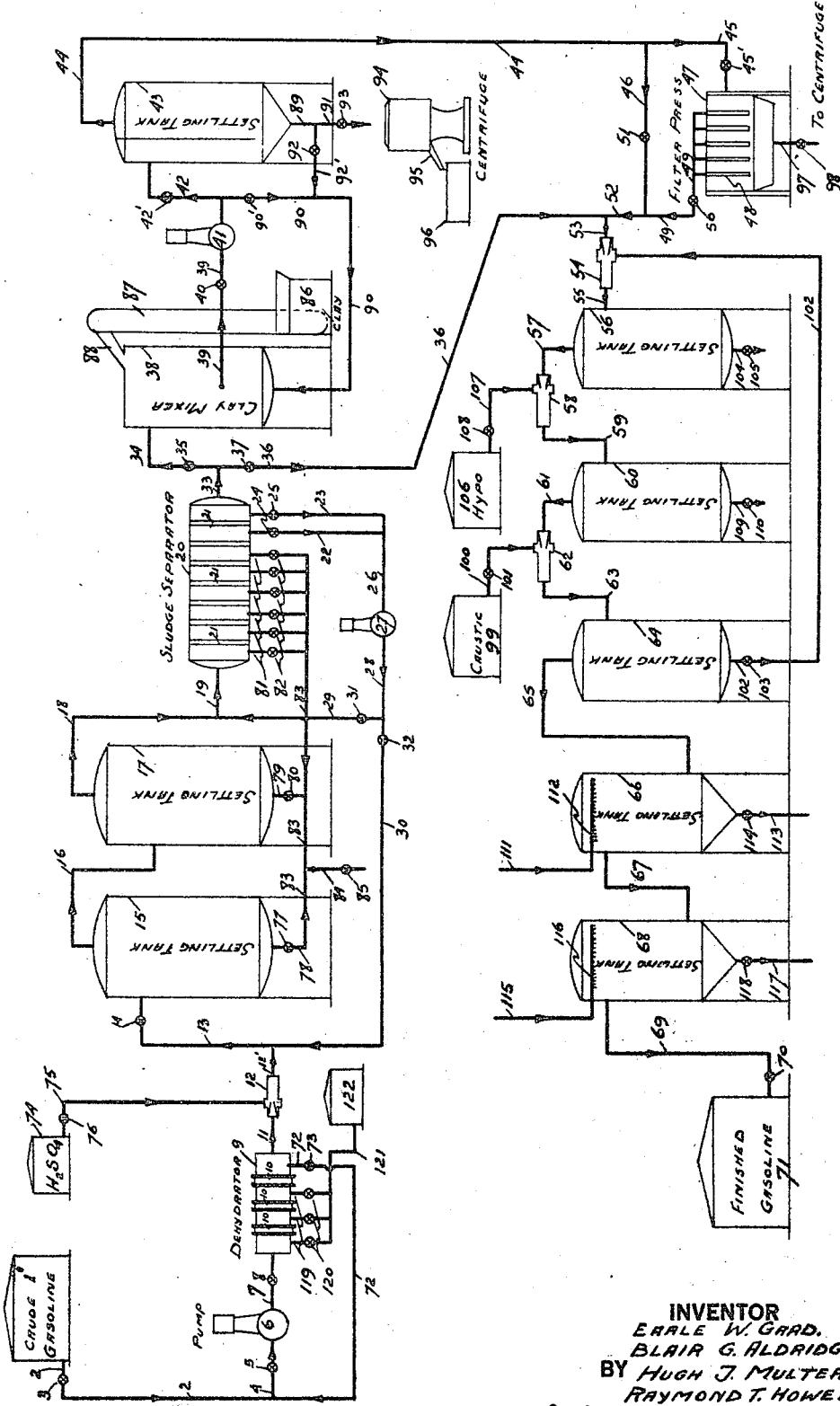

1,759,744

UNITED STATES PATENT OFFICE

EARLE W. GARD, BLAIR G. ALDRIDGE, HUGH J. MULTER, AND RAYMOND T. HOWES, OF LOS ANGELES COUNTY, CALIFORNIA

PROCESS OF REFINING HYDROCARBON OILS

Application filed September 12, 1927. Serial No. 219,147.

This invention relates to a method of treating petroleum oil distillates, and while not necessarily confined thereto, it more specifically relates to the treatment of gasoline or naphtha stocks derived by distillation of crude petroleum oil, or synthetically produced from any of the well-known cracking operations.

This invention is a continuation in part of the applications of Earle W. Gard, Blair G. Aldridge and Hugh J. Multer, Serial Numbers 148,730, 148,731 and 148,732 filed November 16, 1926. In these pending applications an apparatus and process is disclosed for the separation of water and also for the separation of sulfuric acid reaction products from petroleum oils containing the same.

We have discovered an additional improvement to the process of these applications, by means of which a more complete separation of the oil from the separated products of emulsion or suspension may be made. This improvement consists in continuously returning to the filter medium which may be foraminous plates or any other filter medium containing capillary passages, that part of the separated products of emulsion or suspension which contains oil. We have determined that in order to obtain a complete separation of the oil from the products of emulsion, such as water or acid-sludge, in our filter separator, it may be necessary to return a certain percentage of oil along with the products of emulsion separated in the last compartment or last two compartments of the filter separator, which are returned back to the system, to be again passed through the filter separator, thereby making a substantially complete separation of the oil from the undesired products of emulsion which are eliminated continuously from the separator by the draw-off pipes of the other compartments.

Figure 4:
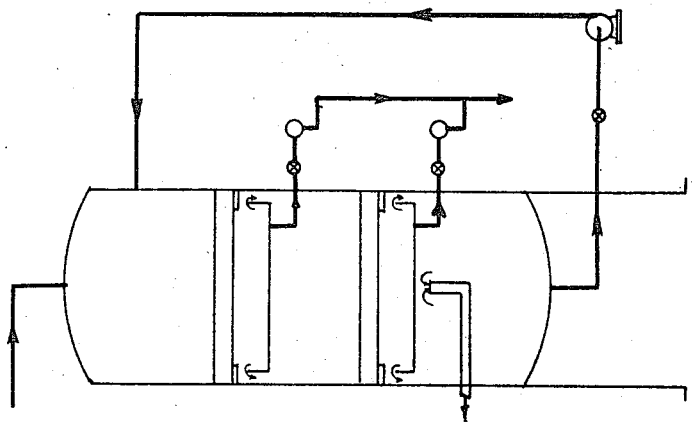
Figure 3:
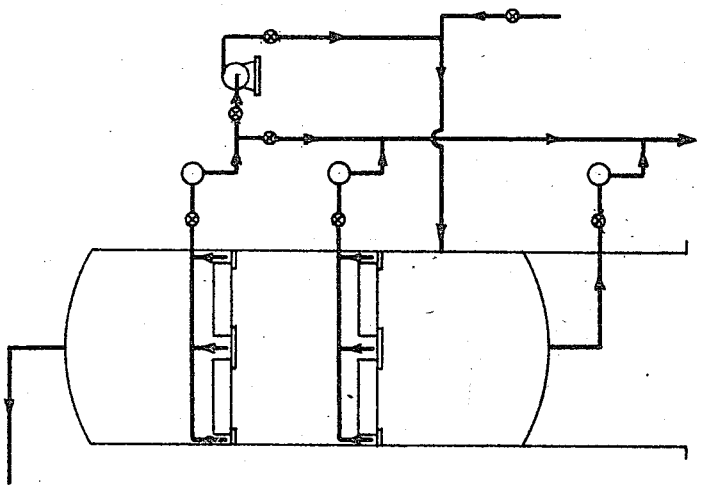
Figure 2:
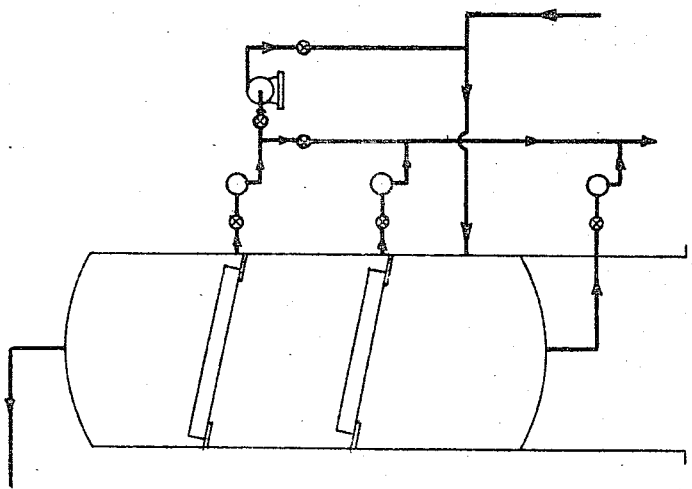

With the foregoing preliminary explanation the preferred form of our invention will now be more fully explained by reference to the accompanying drawings, which are diagrammatical representations of apparatuses, in which the invention may be performed. In Figure 1 of the drawings there is shown a complete apparatus for refining naphtha, gasoline, or lamp oil stocks. Figures 2, 3 and 4 show various forms of filters that may be employed.

In Figure 1, 1' represents generally a tank for holding the naphtha or crude gasoline to be treated. A pipe 2 is connected to the crude gasoline tank 1 at the bottom controlled by a valve 3. The pipe 2 is connected to the branch pipe 4, controlled by a valve 5 and leading to the suction side of pump 6. A pipe 7, controlled by a valve 8, connects the discharge side of pump 6 to the inlet side of the foraminous plate dehydrator 9, in which 10 represents the foraminous filter plates.

119 represents the draw-off pipes from the foraminous plate dehydrator 9 controlled by the valves 120. The said draw-off pipes 119 are connected to a pipe 121 which is connected to a tank 122. 72 is a recirculating pipe controlled by the valve 73, and connected to the pipe 4 leading to the suction side of the pump 6. A pipe 11 is connected to the foraminous plate dehydrator 9 and leads to a jet mixer 12. The jet mixer 12 is connected to a sulfuric acid storage tank 74 by pipe 75 and controlled by valve 76. Pipe 12' connects the jet mixer 12 to a branch pipe 13. The branch pipe 13, controlled by a valve 14 is connected to settling tank 15 near the top. The settling tank 15 is connected to a second settling tank 17 by the pipe 16. A pipe 18 is connected to the top of settling tank 17 and leads to branch pipes 19 and 29.

Branch pipe 19 is connected to sludge separator 20. Sludge separator 20 is provided at the bottom with six draw-off pipes 81 controlled by six valves 82. The draw-off pipes 81 are all connected to a pipe 83, which is connected to settling tank 17 at the bottom by pipe 79 controlled by valve 80. The pipe 83 also is connected to settling tank 15 by the pipes 78 controlled by the valve 77. A branch pipe 84 controlled by a valve 85 is connected to the pipe 83 and leads to a source not shown. The recirculating pipes 22 and 23 controlled by valves 24 and 25 are connected to pipe 26, leading to the suction side of pump 27. The pump 27 discharges through pipe 28 into the branch pipes 29 and 30, which are controlled by valves 31 and 32. Pipe 30 is connected through pipe 13 to the settling tank 15 and pipe 29 is connected through pipe 19 to the sludge separator 20. The sludge separator 20 is provided with a plurality of foraminous plates 21. A pipe 33 connects the sludge separator 20 to a branch pipe 34 and 36 controlled by the valves 35 and 37. The branch pipe 34 is connected to a clay mixer tank 38. The branch pipe 36 is connected to a pipe 52 which in turn is connected to a pipe 53.

The clay mixer 38 is provided with a clay elevator 87, having a clay bin 86 and discharging through a chute 88. A pipe 39, controlled by the valve 40, connects the clay mixer 38 to the suction side of pump 41. The pump 41 discharges into pipe 42 controlled by valve 42' and connected to a settling tank 43. A branch pipe 90, controlled by valve 90', connects the discharge of pump 41 to the bottom of the clay mixer 38. A pipe 89 connects settling tank 43 to pipe 91 and 92' controlled by valves 93 and 92. Pipe 92' is connected through pipe 90 to the clay mixer 38. Pipe 91 leads to a centrifuge 94. The centrifuge 94 is provided with an outlet 95, which discharges into a clay bin 96. A pipe 44 is connected to the settling tank 43 at the top and is connected to a branch pipe 45 and 46 controlled by valve 45' and 51. Pipe 45 is connected to filter press 47 containing filter leaves 48 leading to outlet pipe 49, controlled by valve 50. Pipe 49 being connected by pipe 52 to pipe 53. Pipe 46 is connected by pipe 52 to pipe 53. The pipe 53 is connected to a jet mixer 54 to which is connected pipe 102 controlled by valve 103, connected to a settling tank 64. A pipe 55 connects the discharge side of the jet mixer 43 to a settling tank 56. The settling tank 56 is provided with a draw-off pipe 104 controlled by a valve 105, this draw-off pipe leading to a source not shown. The settling tank 56 is connected by a pipe 57 to a jet mixer 58 which discharges into pipe 59 leading to a settling tank 60. The jet mixer 58 is also connected to a pipe 107 which is connected to a tank 106 and controlled by a valve 108. The settling tank 60 is provided with a draw-off pipe 109 controlled by a valve 110 and leads to a source not shown. The settling tank 60 is connected to a third jet mixer 62 by pipe 61. The said jet mixer 62 is also connected to a pipe 100 controlled by a valve 101, which in turn is connected to a caustic tank 99. The jet mixer 62 discharges into a pipe 63, which is connected to the said settling tank 64. The settling tank 64 is connected at the top by a pipe 65, which leads to a settling tank 66. The settling tank 66 is provided with a draw-off pipe 113 controlled by a valve 114. The settling tank 66 is provided at the top with a water spray 112, which is connected to a pipe 111 which leads to a source of water not shown. The settling tank 66 is connected to settling tank 68 by the pipe 67. The settling tank 68 is provided with a water spray 116 which is connected to a pipe 115 and leads to a source of water not shown. The said settling tank 68 is connected to a finished gasoline tank 71 by the pipe 69 and controlled by the valve 70.

The preferred process as carried out with the apparatus described is as follows:

Gasoline or naphtha stock, stored in tank 1, to be treated, is discharged by pump 6 through the dehydrator 9 passing through the pipe 7 controlled by the valve 8. The dehydrator 9 is provided with a number of foraminous plates 10, by means of which the water contained in the crude gasoline stocks is separated in stages, during the passage through the plates and is drawn off at the end of each stage of separation into tank 122, the flow of separated material being regulated by valves 120, so that substantially none of the gasoline stocks pass into this tank 122.

The final separation of the water from the crude gasoline is attained after the passage of the oil through the last foraminous plate, the separated water being drawn off through the line 72 controlled by the valve 73 along with a certain small percentage of crude gasoline stock, and recirculated in order to separate the water completely. This water containing a small amount of gasoline stock, drawn off from the last compartment of the dehydrator 9, flows into the suction side of the pump 6 and is again passed through the dehydrator 9 along with other stock coming from the crude gasoline tank 1, whereby a dehydrated crude gasoline stock flows from the outlet of the dehydrator 9 and passes into the jet mixer 12, where it receives a flow of sulfuric acid coming from the tank 74 through the pipe 75 controlled by the valve 76.

The quantity of sulfuric acid introduced is regulated in proportion to the amount necessary to treat the gasoline stock to the required degree of color and purity and may be varied from as low as ½ pound to as high as 15 pounds per barrel of gasoline stock treated, or more, depending upon the stock treated and the clarity desired.

In the jet mixer 12 the gasoline and sulfuric acid are commingled and then discharged into a settling tank 15, passing through the pipe 13 controlled by the valve 14. In the settling tank 15 the acid products of reaction settle from the treated gasoline and are drawn off through the pipes 78, 83 and 84 controlled by the valves 77 and 85, to a storage not shown.

The acid treated gasoline still containing certain percentages of acid-sludge or products of reaction from the sulfuric acid treatment passes through the pipe 16 into a second settling tank 17, where more of the acid sludge settles out and in like manner drawn off at the bottom, passing into the pipes 83 and 84, controlled by the valves 80 and 85, the pipe 84 leading to a storage for acid-sludge not shown. From the settling tank 17 the treated gasoline stock passes into the sludge separator 20 where the balance of the acid-sludge or products of the sulfuric acid treatment are substantially completely separated from the treated gasoline which is accomplished by passing through the foraminous plates 21, which agglomerate the suspended acid-sludge and causes the same to settle to the bottom of the various compartments, from which it is drawn off through the draw-off pipes 81 controlled by the valves 82, that substantially no gasoline passes into the pipe 83. A complete separation of the acid-sludge is obtained in the last two compartments of the sludge separator and is drawn off along with a small percentage of the gasoline stock through the pipes 22 and 23 controlled by the valves 24 and 25, this flow being recirculated and regulated so that all the sludge is permitted to flow out of the compartment along with the small percentage of gasoline stock.

This acid sludge containing the small percentage of gasoline stock flows into the suction side of the recirculating pump 27, which discharges the said products through pipe 28 back into the system, either at the settling tank 15, passing through the pipe 30 and 13 controlled by the valve 14, or at the inlet of the sludge separator passing through pipe 29 controlled by valve 31. The acid treated gasoline free of acid reaction products passes from the sludge separator 20 through the pipe 33 into a clay mixer or treating tank 38, where an adsorbent clay is commingled with the acid treated gasoline stock in quantities sufficient to purify and decolorize the gasoline stock to the required degree.

This operation is accomplished by introducing a clarifying and decolorizing clay into the clay mixer 38 through the conveyor 87 and chute 88, a circulating agitation being maintained by means of pump 41 which takes suction on the gasoline stock contained in the clay mixer and discharges a portion of the same through the pipe 90 and controlled by valve 90', and back into the bottom of the said clay mixer 38. The clay treated gasoline stock contained in the clay mixer 38 is continuously discharged into a settling tank 43 by means of the pump 41 passing through the pipe 42 controlled by the valves 42', a small portion of the stock being discharged back into the clay mixer 38 in order to keep the clay and gasoline commingled. The treated gasoline stock and clay which is continuously discharged into settling tank 43, separate, the gasoline being drawn off at the top flows through the pipe 44 and 45 and into the filter press 47 where it is completely separated from any clay particles, which may be carried along with the gasoline stock.

The gasoline stock free of clay passes from the filter press 47 into the pipe 49 controlled by valve 50 and then into a jet mixer 54 where it is commingled with a once-used caustic soda solution, coming from the caustic soda settling tank 64, passing through the pipe 102 controlled by the valve 103. The commingled gasoline stock and once-used caustic soda solution are discharged into the settling tank 56, where the gasoline stock separates from the used caustic soda solution and flows into a second jet mixer 58, passing through the pipe 57. In jet mixer 58 the said treated gasoline stock is commingled with a water solution of sodium hypochlorite in quantities sufficient to render the gasoline stock sweet to the "doctor test." From jet mixer 58 the treated gasoline stock and sodium hypochlorite solution pass into the settling tank 60, where the gasoline separates from the sodium hypochlorite solution and flows into a third jet mixer 62, passing through the pipe 61.

In the jet mixer 62 the sodium hypochlorite treated gasoline stock is commingled with a solution of caustic soda, coming from caustic soda storage tank 99, passing through pipe 100 controlled by valve 101. The commingled gasoline stock and caustic soda solution are discharged from the jet mixer 62 into a settling tank 64 passing through the pipe 63. In the settling tank 64 the caustic treated gasoline stock separates from the caustic soda solution and passes through the pipe 65 into the settling tank 66 where it is washed with a spray of water coming from a source not shown, passing through the pipe 111 and being sprayed into the tank through the jet openings 112.

The gasoline stock passes from settling tank 66 into a second settling tank 68 where it is again washed in like manner as before, with a water spray coming from a source not shown, passing through the pipe 115 and out through the jet openings 116.

The gasoline stock, which is now substantially free from all impurities, passes from the settling tank 68 into the finished gasoline tank 71, through the pipe 69, controlled by the pipe 70.

In the washing operation of the gasoline stock after the treatment with caustic soda, in settling tanks 66 and 68 the water is continuously drawn off, as it separates, through the pipes 113 and 117 controlled by valves 114 and 118, to a source of waste not shown.

The used sodium hypochlorite solution which separates in the settling tank 60 is continuously drawn off, as it separates, through the pipe 109 controlled by the valve 110 through a source not shown.

The used caustic soda solution which separates in the settling tank 56 is continuously drawn off, as it separates, through the pipe 104 controlled by the valve 105 and is conducted to a recovery plant not shown.

The decolorizing clay is drawn off from the settling tank 43 continuously as it separates and passes through the pipe 89 and back into the clay mixer 38 where it is again used along with a new or unused decolorizing clay. However, a portion of this used clay is continuously or intermittently drawn from the settling tank 43 through the pipe 89 and 91 into the centrifuge 94, controlled by the valve 93. In the centrifuge 94 the clay is completely separated from the gasoline stock, the gasoline stock being conveyed back into the settling tank 43, or the settling tank 56, by a means not shown, to be further treated for the production of finished gasoline stock, and the clay, free of gasoline content passes out the chute 95 into the storage bin 96. This clay, substantially free of gasoline content, may be recovered for reuse by methods well-known in the art, or it may be used for the clarifying and decolorizing of lubricating oil stocks. The clay separated from the gasoline stock by the filter press 49 may in like manner, as described, be recovered for re-use or used for clarifying and decolorizing lubricating oil stock.

It is to be understood that any efficient filter medium containing capillary passages may be employed instead of a foraminous plate filter, such for example as glass wool, sand, steel wool, wood pulp, and the like.

While the process herein described is well adapted for carrying out the object of the present invention, it is to be understood that various modifications and changes may be made without departing from the spirit of the invention and the invention includes all such changes and modifications as come within the scope of the appended claims.

What we claim is:

1. In the refining of hydrocarbon oils, that step in the process for separating products of emulsion from an oil, comprising, continuously passing an oil containing products of emulsion through a series of solid foraminous blocks containing capillary passages to agglomerate the emulsified constituent contained in said oil, causing said agglomerated constituents to separate from the oil in stages, continuously removing that part of the agglomerated constituents which is substantially free of oil, continuously re-passing that part of the constituents which is not substantially free of oil again through the same series of solid foraminous blocks, along with the said oil containing the products of emulsion to be agglomerated and separated in stages.

2. In the refining of hydrocarbon oils, that step in the process for separating products of emulsion comprising, continuously passing an oil containing products of emulsion through a plurality of spaced solid foraminous blocks containing capillary passages, containing means for withdrawing liquids between said solid foraminous blocks, agglomerating the emulsified constituents contained in said oil, causing said agglomerated constituents to separate from the oil in stages, continuously removing that part of the agglomerated constituents which is substantially free of oil, continuously re-passing that part of the constituents which is not substantially free of oil again through the same plurality of solid foraminous blocks along with the said oil containing the products of emulsion to be agglomerated and separated in stages.

3. In the refining of hydrocarbon oils, that step in the process of separating products of emulsion from an oil, comprising continuously passing an oil through a plurality of spaced solid foraminous blocks containing capillary passages with means for separating and withdrawing liquids between said solid foraminous blocks; agglomerating, separating and removing a portion of the emulsified constituents substantially free of oil; agglomerating, separating and re-passing the other portion of the emulsified constituents containing oil through the same plurality of spaced solid foraminous blocks along with the said oil containing the products of emulsion to be agglomerated and separated in stages substantially as described.

4. A process of refining hydrocarbon oils comprising, first dehydrating said oil by passing the same through a chamber containing a plurality of spaced filter mediums containing capillary passages, with means for withdrawing liquids between said filter mediums, agglomerating the emulsified water contained in the said oil, causing said agglomerated water to separate from the oil in stages, removing that part of the agglomerated water which is substantially free of oil, re-passing that part of the water which is not substantially free of oil again through the same series of spaced filter mediums along with the said oil containing the water of emulsion to be agglomerated and separated; commingling said dehydrated oil with sulfuric acid in quantities sufficient to combine with constituents to be separated, settling and separating a part of the sulfuric acid with the combined constituents, then passing the acid treated oil with the remaining part of the sulfuric acid and combined constituents though a chamber containing a plurality of spaced filter mediums containing capillary passages, with means for separating and withdrawing liquids between said filter mediums; agglomerating, separating and removing a portion of the acid constituents substantially free of oil; agglomerating, separating and re-passing the other portion of the acid constituents containing oil through the same plurality of spaced filter mediums along with the said oil containing the acid reaction products to be agglomerated and separated in stages; commingling the acid treated oil substantially free of acid constituents with a clarifying and decolorizing agent, separating the clarifying and decolorizing agent with the adsorbed constituents from the clarified and decolorized oil; commingling the acid treated clarified and decolorized oil with an agent capable of rendering the oil "sweet" to the "doctor test", separating the reagent employed for rendering the oil "sweet" to the "doctor test"; commingling the thus treated oil with a water solution of caustic soda, separating the caustic soda from the treated oil, and finally washing the thus treated oil with water.

In testimony whereof we affix our signatures.

EARLE W. GARD.
BLAIR G. ALDRIDGE.
HUGH J. MULTER.
RAYMOND T. HOWES.